United States Patent
Van Lunteren

(10) Patent No.: US 8,126,835 B2
(45) Date of Patent: Feb. 28, 2012

(54) PATTERN DETECTION

(75) Inventor: Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 12/191,468

(22) Filed: Aug. 14, 2008

(65) Prior Publication Data

US 2009/0055343 A1  Feb. 26, 2009

(51) Int. Cl.
*G06F 17/00* (2006.01)
*G06N 5/02* (2006.01)

(52) U.S. Cl. ........................................... 706/48

(58) Field of Classification Search .................. None
See application file for complete search history.

(56) References Cited

OTHER PUBLICATIONS

'Fast and scalable packer classification': Van Lunteren, 2003, IEEE, 0733-8716, pp. 560-571.*
'Multi-field packet classification using ternary CAM': Van Lunteren, 2002, Electronic letters vol. 38, No. 1., pp. 21-23.*
'Dynamic multi-field packet classification': Van Lunteren, 2002, IEEE, 0-7803-7632-3, pp. 2215-2219.*
J. van Luteren et al.; "Fast and Scalable Packet Classification;" IEEE Journal on Selected Areas in Communications, vol. 21, No. 4, May 2003; pp. 560-571.

* cited by examiner

*Primary Examiner* — Omar Fernandez Rivas
*Assistant Examiner* — Peter Coughlan
(74) *Attorney, Agent, or Firm* — Cantor Colburn LLP; Vazken Alexanian

(57) ABSTRACT

Apparatus for detecting a pattern in a data stream comprises a pattern matching device for receiving the data stream. The pattern matching device comprises one or more rule engines, each rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component, the first, second and third rules having differing priorities, and at least one state transition rule including an output component indicating a pattern match. The apparatus is arranged to pass the data stream to each rule engine, and is further arranged to output a signal indicating a pattern match when a state transition rule indicates a pattern match.

23 Claims, 9 Drawing Sheets

PATTERN DETECTION

FIELD OF THE INVENTION

This invention relates to an apparatus and to a method for detecting a pattern in a data stream.

BACKGROUND OF THE INVENTION

The detection of a particular pattern in a data stream is used in many computing environments. For example, in fields such as virus detection, the data stream that is being received by a computer will need to be monitored for the presence of viruses. The virus checker will be able to recognise specific viruses and also viruses of generic types. The virus checker will have access to a data structure that includes a large number of different patterns, probably over a thousand in number. The patterns can yyyy//yy//..prise simple character sequences (strings) such as "password" or can be specified in a more flexible way, for example, using regular expressions that can include generic references to character classes and the number of occurrences of certain character and character sequences.

A data stream that is received by a computer, which needs to be analysed, will be formed of a series of bytes and in a common protocols such as TCP/IP (used for Internet communication) these bytes will be received in the form of data packets. These data packets that form the data stream are scanned for the presence of the stored patterns as the stream is received. This scanning can be executed by software, or in some environments a dedicated ASIC of an FPGA can be used to carry out the pattern matching. If a pattern is detected, then an output signal is generated, and depending upon the application, then action such as deleting the pattern from the data packet is executed.

All known pattern matching systems have one or more weaknesses. These include a large storage requirement for the data structure, the high consumption of processing resources, the difficulty of the pattern matching working in real time on streamed data, and the difficulty in updating the data structure storing the patterns, when new patterns for new viruses are to be added to the data structure.

In A. V. Aho and M. J. Corasick, "Efficient string matching: An aid to bibliographic search," Communications of the ACM, vol. 18, no. 6, pp. 333-340, 1975, is described an algorithm for performing pattern-matching by constructing a conventional state transition diagram. The algorithm consists of constructing a finite state pattern matching machine from the keywords and the using the machine to process the text string in a single pass. The approach combines the ideas of the Knuth-Morris-Pratt algorithm with those of finite state machines. The storage efficiency, pattern-matching performance, and update performance of this method are however rather limited.

SUMMARY OF THE INVENTION

It is therefore an aspect of the invention, to improve upon the known art. According to a first aspect of the invention, there is provided apparatus for detecting a pattern in a data stream comprising a pattern matching device for receiving the data stream. The pattern matching device comprising one or more rule engines with each rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component, the first, second and third rules having differing priorities, and at least one state transition rule including an output component indicating a pattern match, the apparatus arranged to pass the data stream to said at least one rule engine, and further arranged to output a signal indicating a pattern match when a state transition rule indicates a pattern match.

According to a second aspect of the invention, there is provided a method for detecting a pattern in a data stream comprising receiving the data stream, running one or more rule engines with each rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component, the first, second and third rules having differing priorities, and at least one state transition rule including an output component indicating a pattern match, passing the data stream to said at least one rule engine, and outputting a signal indicating a pattern match when a state transition rule indicates a pattern match.

According to a third aspect of the invention, there is provided a computer program product on a computer readable medium for controlling apparatus for detecting a pattern in a data stream, the computer program product comprising instructions for receiving the data stream, running one or more rule engines, said at least one rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component, the first, second and third rules having differing priorities, and at least one state transition rule including an output component indicating a pattern match, passing the data stream to said at least one rule engine, and outputting a signal indicating a pattern match when a state transition rule indicates a pattern match.

BRIEF DESCRIPTION OF THE DRAWINGS

These and other aspects and features of the present invention will become clear from the following description by way of example only, taken in conjunction with the accompanying drawings, in which.

DESCRIPTION OF THE INVENTION

Figure 1:
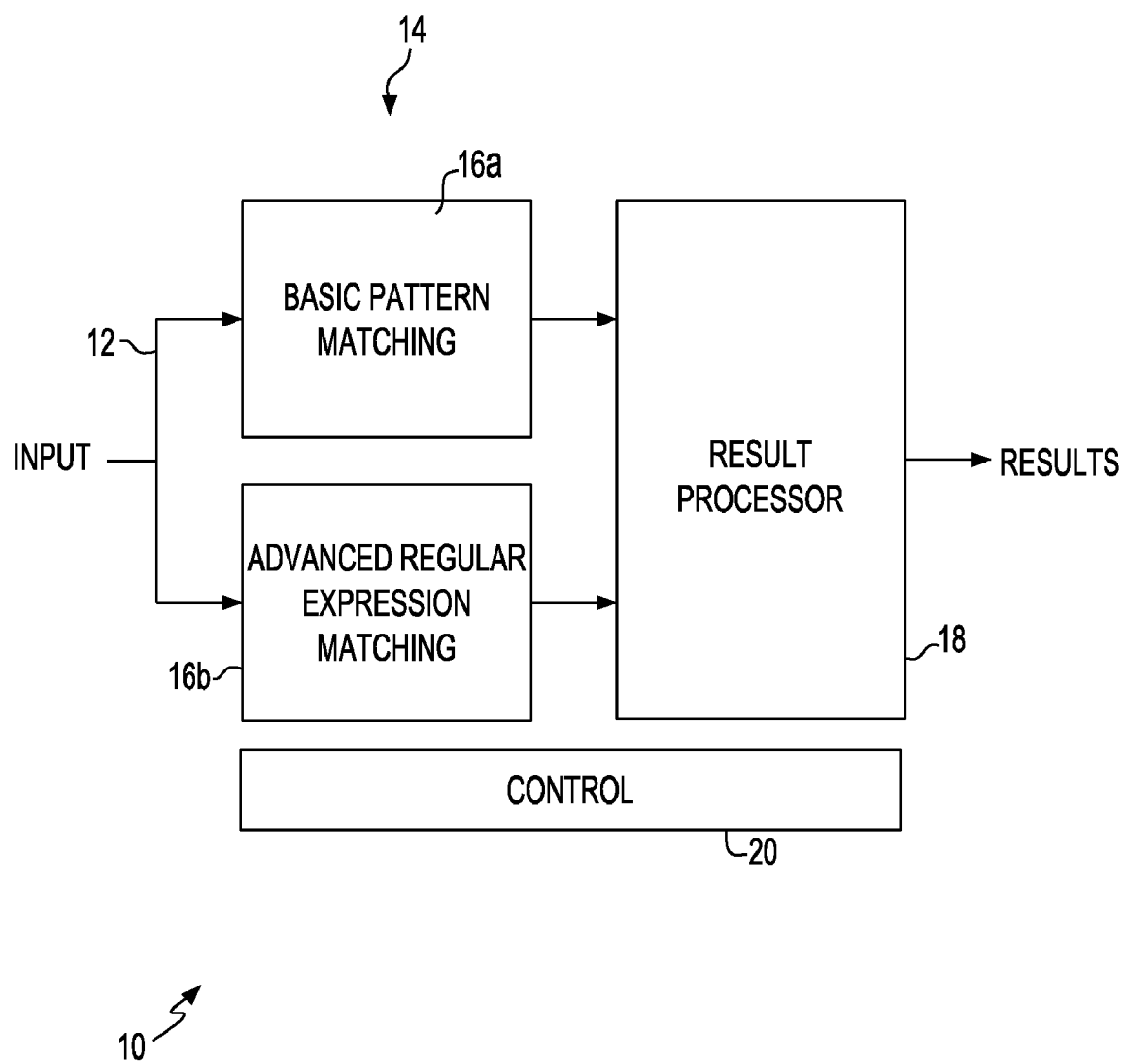
FIG. 1 is a schematic diagram of apparatus for detecting a pattern in a data stream.

The present invention provides methods, apparatus and systems for detecting a pattern in a data stream. An example apparatus comprises a pattern matching device for receiving the data stream. The pattern matching device comprising one or more rule engines, said at least one rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component, the first, second and third rules having differing priorities, and at least one state transition rule including an output component indicating a pattern match, the apparatus arranged to pass the data stream to said at least one rule engine, and further arranged to output a signal indicating a pattern match when a state transition rule indicates a pattern match.

There is provided a method for detecting a pattern in a data stream comprising receiving the data stream, running one or more rule engines, the one or more rule engines operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component, the first, second and third rules having differing priorities, and at least one state transition rule including an output component indicating a pattern match, passing the data stream to the one or more rule engines, and outputting a signal indicating a pattern match when a state transition rule indicates a pattern match.

There is further provided a computer program product on a computer readable medium for controlling apparatus for detecting a pattern in a data stream. A computer program product comprising instructions for receiving the data stream, running one or more rule engines with each rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component, the first, second and third rules having differing priorities, and at least one state transition rule including an output component indicating a pattern match, passing the data stream to the one or more rule engines, and outputting a signal indicating a pattern match when a state transition rule indicates a pattern match.

Owing to the invention, it is possible to provide an improved pattern matching method. The use of rule engines, based upon state transition rules that include priorities, to execute the pattern matching based upon state transition rules facilitates a system that can operate at real time on the data stream as it is received, and efficient use of computational and memory resources is achieved. The data structure storing the patterns can be updated in a simple and timely manner.

Advantageously, the apparatus further comprises a pattern distribution device arranged to receive the patterns, to distribute the patterns across a plurality of pattern collections, and to convert each pattern collection into a plurality of state transition rules. The pattern distribution device executes an algorithm to split the patterns into a series of pattern collections, equal to the number of rule engines. Preferably, the pattern distribution device is arranged to distribute the patterns substantially evenly across the plurality of pattern collections. By splitting the patterns evenly across the collections, the most efficient use of processing resources is achieved, as each rule engine will be handling a similar number of patterns.

Ideally, the pattern distribution device is arranged, when distributing the patterns across the plurality of pattern collections, to distribute the patterns according to commonality and conflict between patterns. Commonality between patterns could be, for example, a common prefix between patterns, and conflict between patterns could be, for example, a substring of one pattern (not including the first letter) being a prefix of another pattern. By distributing the patterns across the collections such that those patterns with commonality are in the same collections and those patterns with conflicts are in different collections, the number of state transition rules for each rule engine is reduced, in the ideal case even minimized, with the consequential reduction of the consumption of storage and processing resources.

Advantageously, the apparatus further comprises a results processor for receiving output from the one or more rule engines, the results processor arranged to determine if a pattern match has occurred. The results processor can be used, in a simple setup to collate the output signals received from the rule engines, or in more complicated arrangements, it can be used to determine if a pattern match has occurred. This might happen if the original pattern is relatively complicated, and it is not computationally efficient to have a single rule engine determine the pattern match. Instead, multiple engines can be used to detect different portions of the pattern, while the result processor then will determine if the original pattern is matched, based on the match results for pattern portions. The results processor is able to check such things as transition rules specifying additional conditions in their outputs, which may relate to the location of patterns in the data stream, as well as the order that multiple patterns should be detected and the distance between the multiple patterns in the data stream.

Ideally, at least one of the state transition rules includes a character class component. Character classes can define particular groups of characters, for example, numerical and alphanumerical values. By supporting the use of character classes, complicated patterns can be relatively simply transformed into state transition rules for simple processing by a rule engine.

Advantageously, the pattern matching device comprises a plurality of rule engines. In almost all practical applications of the pattern matching device, multiple rule engines will be used that each, in parallel, process the inputted data stream. Since the original patterns have been split into pattern collections that place conflicting patterns apart, then the greater the number of rule engines, the greater the reduction in conflict between patterns in each pattern collection. The actual number of rule engines that are used by the pattern matching device is a design choice, but suitable values for many applications would be 8 or 16 rule engines. The greater the number of engines used, the smaller the total memory demand will be. This is because the reduction in conflicts between patterns reduces the number of state transition rules to encode those patterns, and consequently, the amount of memory to store the state transition rules.

Advantageously, the rule engines are arranged in one or more pairs of rule engines, with the or each pair of rule engines processing alternate portions of the data stream, with the results processor being arranged to combine the outputs of the or each pair of rule engines. Many different arrangements of the rule engines are possible, in a variety of parallel and serial combinations. These can be decided as design choices to increase the speed of the pattern matching, depending upon the resources available.

The pattern matching apparatus has the following functional characteristics. It supports multiple pattern types including character strings and regular expressions. It supports multiple pattern conditions that can be specified separately for each pattern: case sensitivity, location at which the pattern should be detected within the input stream (typically specified using offset/depth parameters). The pattern matching apparatus will detect all patterns in the input stream, including multiple occurrences and overlapping patterns. It is scalable to support for at least tens of thousands of patterns. There is no basic limitation on maximum pattern length except for memory capacity. It supports rules involving multiple patterns with interdependent conditions, for example, the order in which the patterns involved in a rule should be detected, and the distance between the locations in the input stream at which the patterns should be detected. It supports dynamic incremental updates (programmable by modifying memory contents). The apparatus is suitable for ASIC and FPGA implementation.

The performance characteristics of the apparatus include: on-the-fly (single pass) operation involving a deterministic processing rate of at least one character per clock cycle, which can be increased to multiple characters per clock cycle through different types of parallelization. It is more storage-efficient through a novel compression technique, for example: 1500 fixed match patterns extracted from a commercial intrusion detection rule set, comprising a total of 25K characters will fit in approx. 100 KB. The apparatus has a better update performance: a pattern update (insert/delete) takes approx. 1 ms-2 ms using an update function executed in software on a state-of-the-art processor. The apparatus provides the capability to active rules within much less than 1 ms.

FIG. 1 shows schematically apparatus 10 for detecting a pattern in a data stream 12. The apparatus 10 could be an application specific integrated circuit (ASIC) or could be a field programmable gate array (FPGA) or could be a general processor (such as an Intel Pentium) under the control of software. The apparatus 10 has many applications, including such things as intrusion detection. In the world of computing, the detection and disabling of viruses and other malignant software components is desired, in any system where data is being received from the outside world, via, for example, the Internet.

The apparatus 10 comprises a pattern matching device 14 for receiving the data stream 12 and carrying out the pattern matching. The pattern matching device 14 comprises a plurality of rule engines 16a, 16b. The operation of the rule engines is described in more detail below. In FIG. 1, the rule engines are shown as grouped into two functional components, a basic pattern matching group of rule engines 16a and a regular expression matching group of rule engines 16b. The apparatus 10 also includes a results processor 18 and a control device 20.

The data stream 12 received by the apparatus 10 comprises a series of bytes, which may be a continuous stream or may be in the form of data packets (as is common in Internet communication). The apparatus 10 scans the data stream 12 for the existence of specific patterns. Each rule engine 16a, 16b is operating under a plurality of state transition rules, which encode a plurality of patterns. The apparatus 10 is arranged to pass the data stream 12 to each rule engine 16, and further arranged to output a signal indicating a pattern match when a state transition rule indicates a pattern match.

Figure 2:
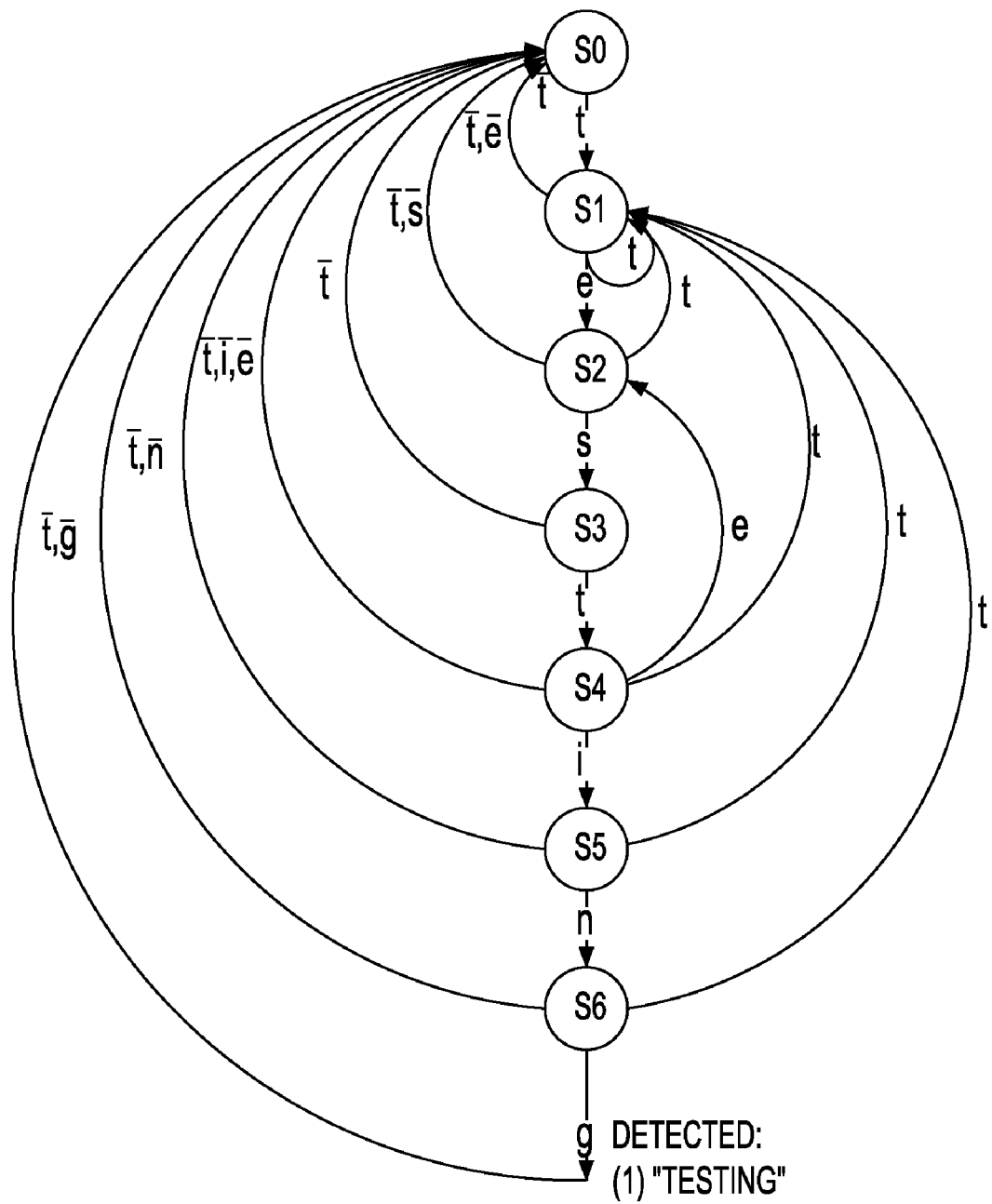
FIG. 2 is a state transition diagram.

In order to explain the relationship between the patterns and the state transition rules, FIG. 2 shows a state transition diagram for detection of the pattern "testing". The state transition rules that encode this diagram are as follows:

| rule | current state | input | -> | new state | output | Priority |
|------|---------------|-------|-----|-----------|--------|----------|
| R1 | * | * | -> | S0 | — | 0 |
| R2 | * | t | -> | S1 | — | 1 |
| R3 | S1 | e | -> | S2 | — | 2 |
| R4 | S2 | s | -> | S3 | — | 2 |
| R5 | S3 | t | -> | S4 | — | 2 |
| R6 | S4 | i | -> | S5 | — | 2 |
| R7 | S5 | n | -> | S6 | — | 2 |
| R8 | S6 | g | -> | S0 | 1 | 2 |
| R9 | S4 | e | -> | S2 | — | 2 |

Figure 11:
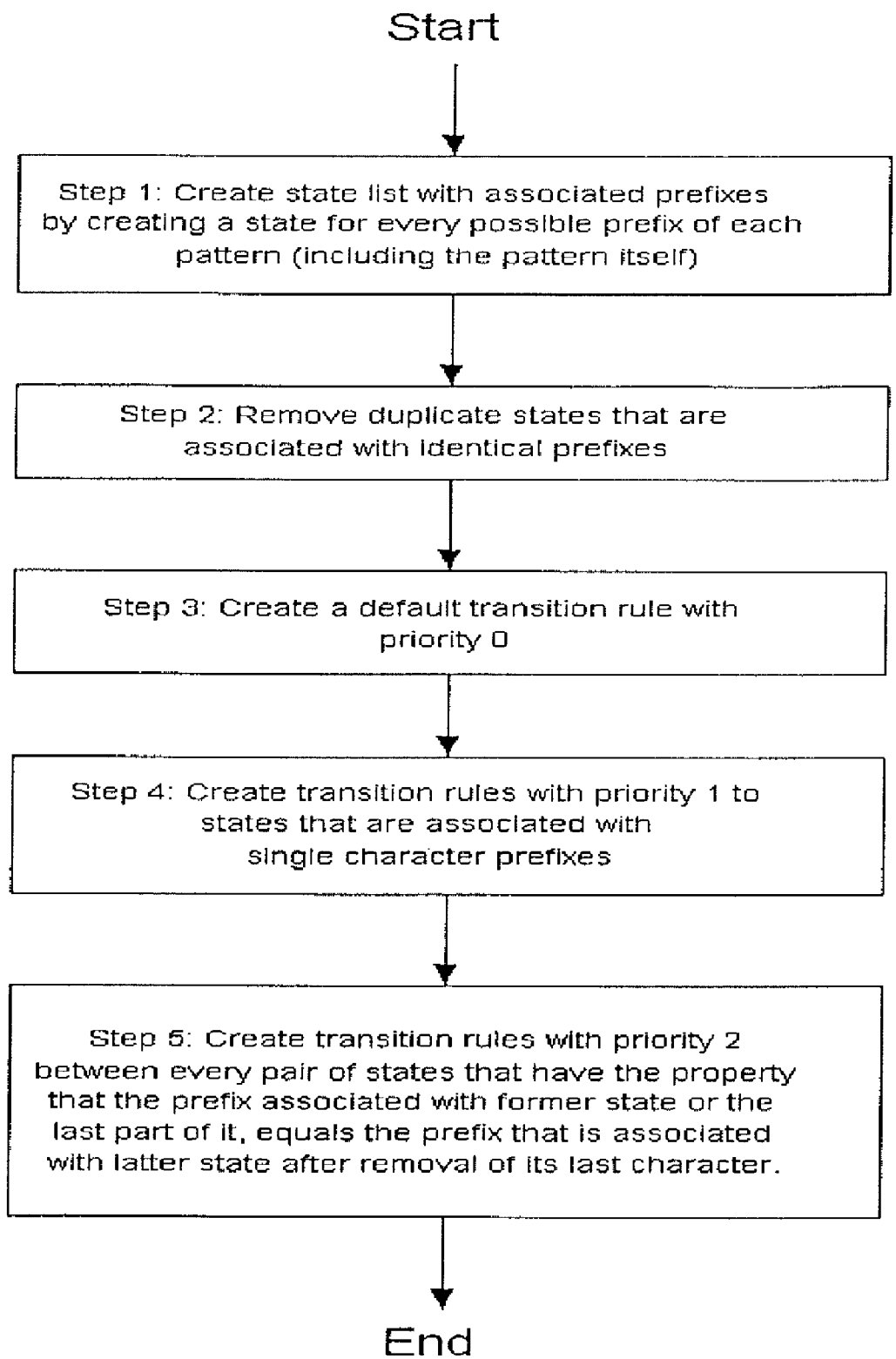
FIG. 11 is a flowchart of an algorithm for converting a pattern collection into a series of state transition rules.

The rules are generated automatically by an algorithm; this is discussed in more detail below, with reference to FIG. 11. Each rule governs the operation of the rule engine by moving from a first state to a second state according to the input, with a possible output being triggered by change in state. The wildcard character * in rules one and two refers to any state or input. The first state transition rule R1 includes a wildcard state component and a wildcard input component, the second state transition rule R2 includes a wildcard state component and a specified input component, and the third state transition rule R3 includes a specified state component and a specified input component. The first, second and third rules have differing priorities.

Because of the wildcards, it is possible that multiple rules can match for a given state and input. In order to resolve that situation, the state transition rules are assigned a priority. When deciding on the change of state, the rule engine will act on the rule with the highest priority, in case of multiple matching rules. Rule R8 includes an output component indicating a pattern match, which is the numeral one in the output column for that rule. This set of rules will return an output one for each and every presence of the string "testing" in any longer string, without returning an output one in any false circumstances.

Figure 3:
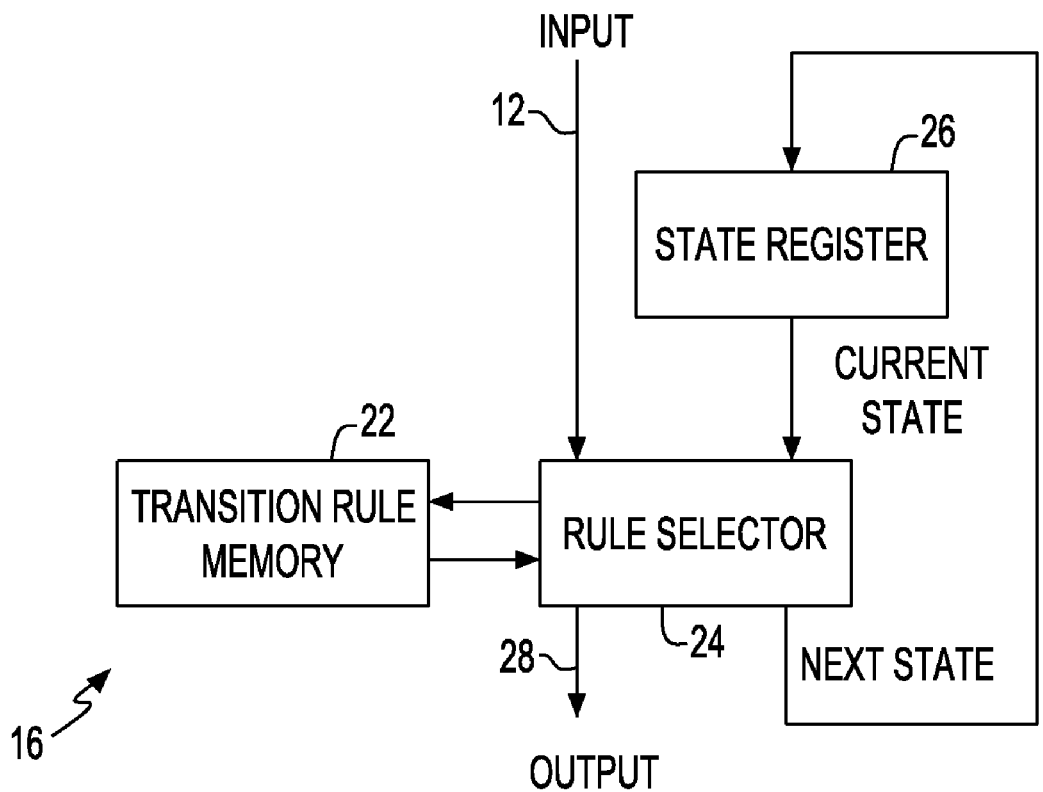
FIG. 3 is a schematic diagram of a rule engine of the apparatus of FIG. 1.

FIG. 3 shows in more detail the logical working of a rule engine 16 (the component 16a of FIG. 1 "basic pattern matching" can contain multiple rule engines). The rule engine has three principal functional components, being a transition rule memory 22 which stores the rules such as those in the table above, a rule selector 24 which determines which rule applies, and a state register 26 which keeps track of the current state of the rule engine 16. According to the output component of the rules, an output 28 is generated. For example, if a portion of the data stream 12 is "testesting" (which contains only a single match with the pattern "testing", then the rule engine 16 operating according to the rules of the table above will work as follows:

Starting state S0 (the rule engine 16 will always default to this state),
first letter "t" rule 2 applies and moves to state S1 (rule 2 has a higher priority than rule 1 and so takes precedence, rule 5 does not apply as the current state is not S3),
second letter "e" rule 3 applies and moves to S2,
third letter "s" rule 4 applies and moves to S3,
fourth letter "t" rule 5 applies and moves to S4,
fifth letter "e" rule 9 applies and moves to S2,
sixth letter "s" rule 4 applies and moves to S3, seventh letter "t" rule 5 applies and moves to S4,
eighth letter "i" rule 6 applies and moves to S5,
ninth letter "n" rule 7 applies and moves to S6,
tenth letter "g"; rule 8 applies and moves to S0, but returns an output of 1, indicating that the pattern "testing" has been detected in the data stream 12 being passed through the rule engine 16.

Figure 4:
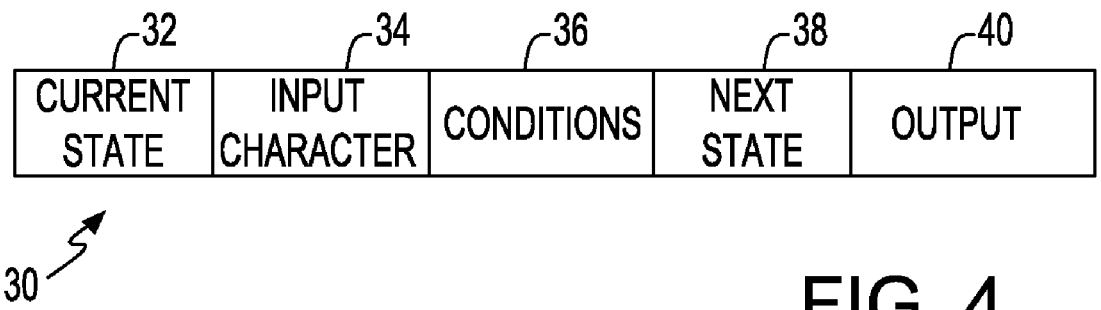
FIG. 4 is schematic diagram of a state transition rule.

FIG. 4 shows a generalised form for a state transition rule 30, with the components of current state 32, input character 34, conditions 36, next state 38 and output component 40. The priority components of the state transition rules are reflected in the way that the rules are stored in the transition rule memory 22 (FIG. 3). For all basic patterns, a transition rule in this format is sufficient, and all such patterns can be reduced to a series of such state transition rules 30. The output component 40 can, as shown above, return a simple value, such as a numeral 1, or may return other values that are then processed by the results processor 18.

In the simple example of FIG. 2, a single pattern "testing" is detected by the rule engine 16. Since, in most practical applications, over a thousand patterns will be being monitored by the pattern matching device 14, each rule engine 16 will be monitoring for multiple patterns, perhaps in the range 50-2000. As the number of patterns being monitored by a rule engine increases, then the state diagram representing the detection process will become more complicated, and as a corollary, the number of state transition rules to encode the diagram will increase.

Figure 5:
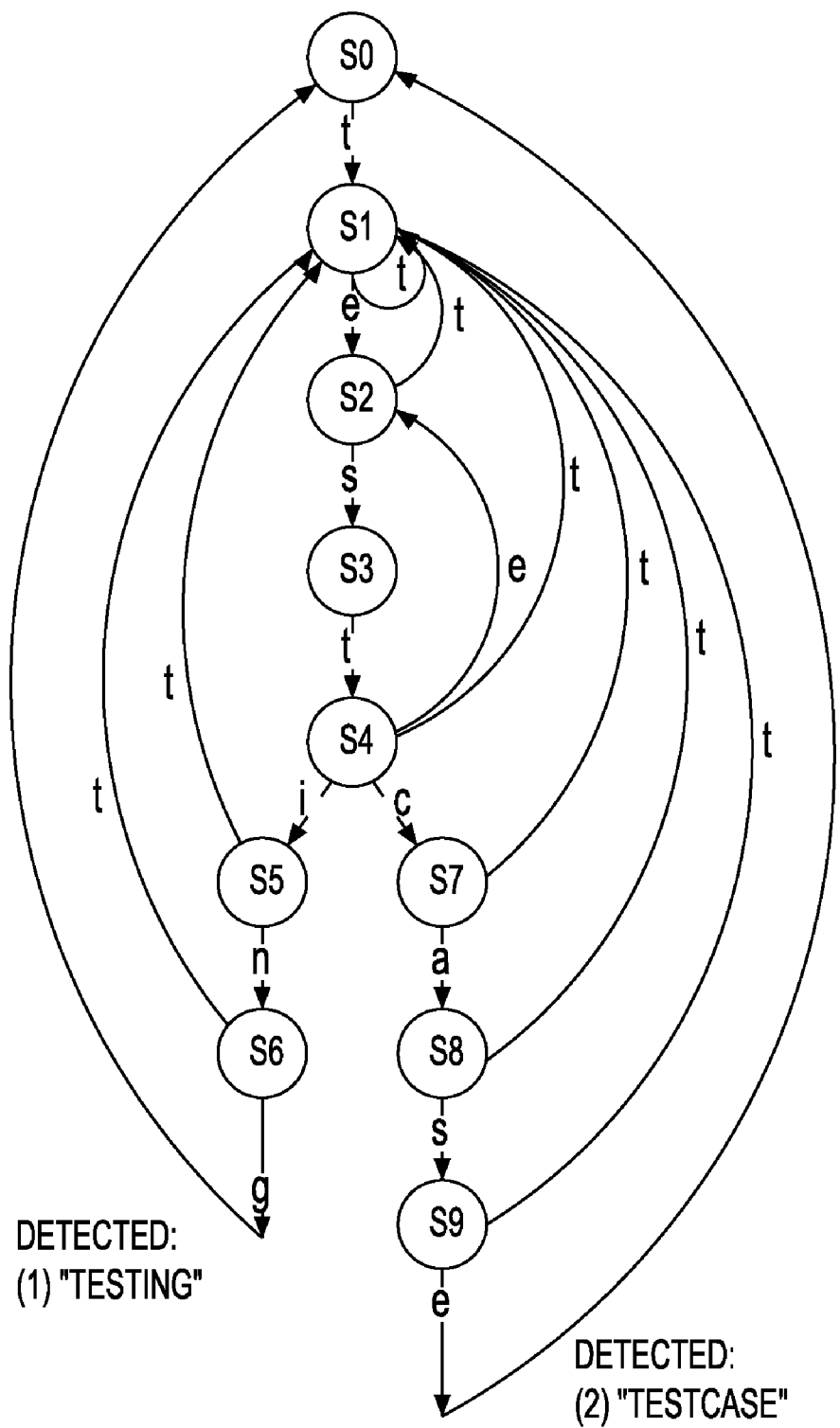
FIG. 5 is a second state transition diagram.

To illustrate this concept, FIG. 5 shows a state transition diagram for a rule engine that will detect both the patterns "testing" and "testcase". For ease of understanding, this diagram has been simplified by the omission of the returns to S0 encoded by rule R1. The rules that encode this state diagram are as follows:

| rule | current state | input | -> | new state | output | priority |
|---|---|---|---|---|---|---|
| R1  | *  | *  | -> | S0 | —  | 0 |
| R2  | *  | t  | -> | S1 | —  | 1 |
| R3  | S1 | e  | -> | S2 | —  | 2 |
| R4  | S2 | s  | -> | S3 | —  | 2 |
| R5  | S3 | t  | -> | S4 | —  | 2 |
| R6  | S4 | i  | -> | S5 | —  | 2 |
| R7  | S5 | n  | -> | S6 | —  | 2 |
| R8  | S6 | g  | -> | S0 | 1  | 2 |
| R9  | S4 | c  | -> | S7 | —  | 2 |
| R10 | S7 | a  | -> | S8 | —  | 2 |
| R11 | S8 | s  | -> | S9 | —  | 2 |
| R12 | S9 | e  | -> | S0 | 2  | 2 |
| R13 | S4 | e  | -> | S2 | —  | 2 |

These rules encode the pattern detection of the two patterns "testing" and "testcase", with an output 1 being returned if the former is detected, and an output 2 being returned if the latter is detected. It will be appreciated that as further patterns are to be matched by the rule engine, then further rules are used to encode each and all of the patterns.

Some patterns have components within them that are case sensitive. This can be supported in two ways, which can be combined. Firstly, case-sensitivity specified at the pattern level can be resolved by allocating selected rule engines to perform case-sensitive matching, with the remaining rule engines performing case-insensitive matching. Secondly case sensitivity specified at the character level can be dealt with by each rule engine performing both case-sensitive and case-insensitive matching.

An example of case sensitivity at character level would be the pattern: [aA]B[cC], which matches: "aBc", "ABc", "aBC", "ABC". This can be detected in the rule engine by using the condition component 36 of a state transition rule 30 to specify that a particular rule only operates when the specific case sensitive input character is received. The rule selector component 24 (FIG. 3) will select a matching rule, by taking the case-sensitive/insensitive condition flag into account.

Each transition rule is stored as a transition rule vector in the transition rule memory 22. The rule selector 24 searches the highest-priority transition rule matching the current state and input character in one cycle.

The set of state transition rules are stored as an efficient data structure, with the processing logic of the rule selector. One way of achieving this is to compile the memory and logic into a B-FSM engine, which is based on a special hash-function for efficiently searching the state transitions rules. This technology is described in, for example, J. van Lunteren, A. P. J. Engbersen, J. Bostian, B. Carey, and C. Larsson, "XML accelerator engine," First International Workshop on High Performance XML Processing, in conjunction with the 13th International World Wide Web Conference (WWW2004), New York, N.Y., USA, May 2004.

A key feature of the B-FSM engine is that it has an approximately linear relation between the number of transitions and the memory size, in contrast to prior-art programmable state machines that typically have an exponential relation between state and input vector widths and memory size. As a result, the B-FSM engine can support a larger number of states and wider input and output vectors, being less limited by memory size. Several optimizations, including state encoding and partitioning of the state transition diagram into multiple state clusters that are each stored in separate hash-tables, allow the B-FSM engine to support larger state diagrams (e.g., 10K-100K states).

The B-FSM provides a higher performance, with a maximum rate of one state transition per cycle (for frequencies into the GHz range for state-of-the-art ASIC technology). Because the data structure is contained in conventional memory (e.g., SRAM), the B-FSM engine supports dynamic updates of the state transition diagram involving incremental addition and removal of states and transitions, which are realized by incremental modification of data structure in the transition rule memory. Multiple state diagrams can be supported simultaneously and are selected through the start addresses of corresponding data structures in memory.

Figure 6:
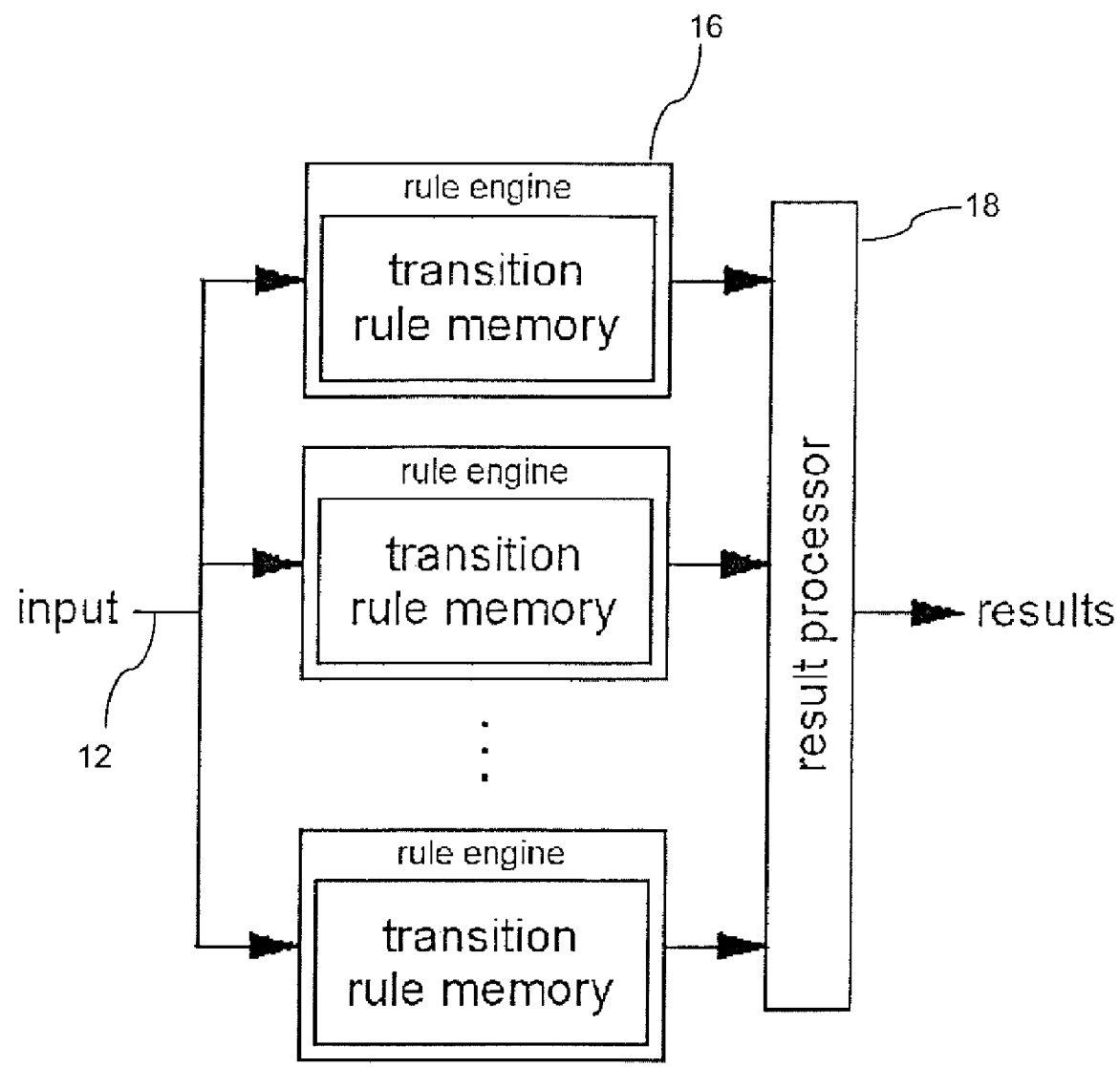
FIG. 6 is a schematic diagram of a further portion of the apparatus of FIG. 1.

FIG. 6 shows one example of the design of the apparatus 10, with multiple rule engines 16 placed in parallel. Each rule engine receives the data stream 12 as an input and passes an output to the results processor 18. This is the simplest embodiment, with each rule engine 16 carrying out independent pattern matching on a discrete number of patterns, with each engine 16 working on patterns not covered by the other engines 16.

However, the rule engines 16 can be arranged in pairs of rule engines 16, with each pair of rule engines 16 processing alternate portions of the data stream 12. One member of the pair could work on the even bytes of the data stream 12, with the other member of the pair of engines 16 working on the odd bytes. The results processor 18 is therefore arranged to combine the outputs of each pair of rule engines 16. By working on alternate bytes, the processing of the data stream 12 is speeded up, with a consequent increase in the complexity of the engines 16 carrying out the pattern matching. The average processing rate can also be increased through an encoding of the input stream (based upon statistical information on that stream). Other arrangements for the rule engines 16 are possible, including having the engines 16 working in series, with different aspects of a pattern match being carried out by different rule engines. This is particularly advantageous when detecting more complicated patterns.

The results processor 18 can provide support for rules involving multiple patterns, such as checking the occurrences, order and offsets/distances of multiple patterns. The output of the (multiple) rule engines comprises the pattern identifiers that have been detected in the input stream combined with the offsets at which these have been detected. The result processor component will then be able (based on a data structure stored in a local memory—not shown) to check rules specifying additional conditions regarding the location where patterns should be detected (e.g., exact location, certain portion, or in the entire input stream), as well as conditions regarding the order in which multiple patterns should be detected and the distance between them (i.e., between the offsets).

In order to test for the presence of regular expressions within a data stream, more complicated state transition rules and a more complicated rule engine are used. A feature of the advanced state transition rule is the ability to specify a character class in place of the normal specific input of a character. For example in rule R2 above the input is the letter "t". However, the advanced rule engine, shown in FIG. 7 includes a character classifier 42, which will characterise the byte in the input stream 12, and the state transition rule used by the rule selector 24 may test the character class rather than the actual input character. Examples of sets of character classes include,

| | |
|---|---|
| \d | numeric ("digit") |
| \D | not numeric |
| \w | alphanumeric |
| \W | not alphanumeric |
| \s | whitespace (space, carriage return, tab, new line, form feed) |
| \S | not whitespace. |

These operators can be specified in the state transition rules instead of the wildcard of rule R1 or the specified inputs of the other rules.

Figure 7:
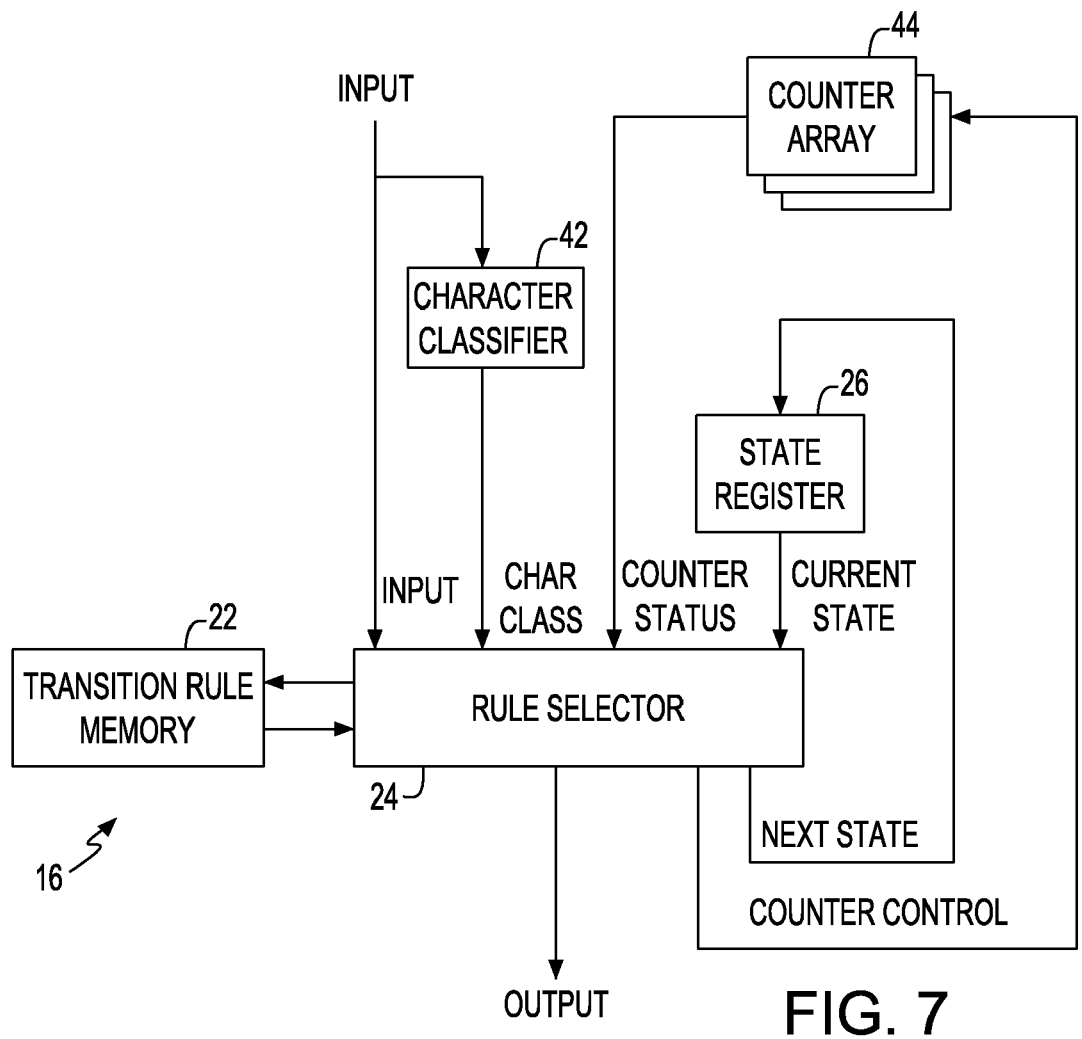
FIG. 7 is a schematic diagram of an enhanced rule engine of the apparatus of FIG. 1.
Figure 8:
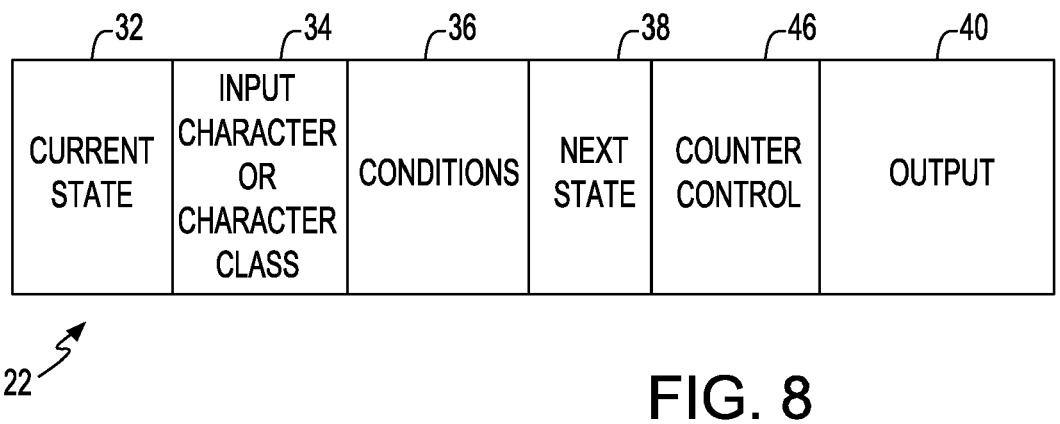
FIG. 8 is schematic diagram of a second state transition rule.

The rule engine 16 of FIG. 7 also includes the functional component of a counter array 44. The counter array is used in specific situations where a particular pattern that is being detected includes an expression along the lines of "no \s (white space) in the next 100 characters". To detect this type of expression, the advanced state transition rule 22 of FIG. 8 includes a counter control component 46 which can specify the length of any count and the conditions attached to the count. Once a rule is selected by the rule selector that includes an active counter control component 46, then the counter array 44 in the rule engine 16 will execute the counting function and control the appropriate output of the rule engine 16 in respect of whether there is a match against the particular pattern.

Figure 9:
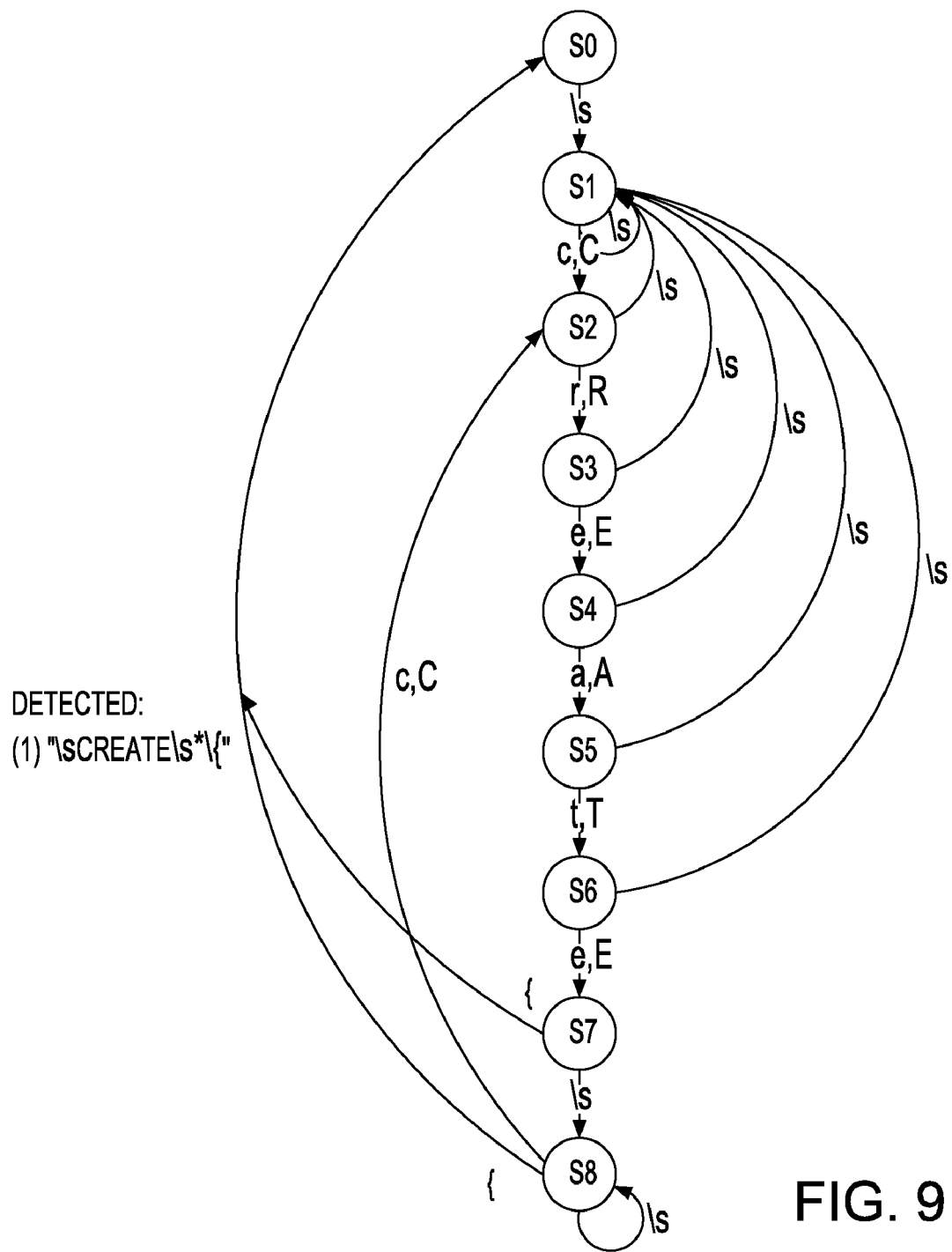
FIG. 9 is a third state transition diagram.

FIG. 9 illustrates a state transition diagram for a set of rules that encode a regular expression. The regular expression that is represented by this diagram is:

"\sCREATE\s*\{"

This would detect such strings in the inputted data stream 12 as:

" CREATE {", and
"<newline>create <tab> {"

For ease of understanding, this diagram has been simplified by the omission of the returns to S0 encoded by rule R1, as with FIG. 5. The rules that encode this state diagram are as follows:

| rule | current state | input | -> | new state | output | priority |
|---|---|---|---|---|---|---|
| R1  | *  | *  | -> | S0 | — | 0 |
| R2  | *  | \s | -> | S1 | — | 1 |
| R3  | S1 | c  | -> | S2 | — | 2 |
| R4  | S2 | r  | -> | S3 | — | 2 |
| R5  | S3 | e  | -> | S4 | — | 2 |
| R6  | S4 | a  | -> | S5 | — | 2 |
| R7  | S5 | t  | -> | S6 | — | 2 |
| R8  | S6 | e  | -> | S7 | — | 2 |
| R9  | S7 | \s | -> | S8 | — | 2 |
| R10 | S7 | {  | -> | S0 | 1 | 2 |
| R11 | S8 | \s | -> | S8 | — | 2 |
| R12 | S8 | {  | -> | S0 | 1 | 2 |
| R13 | S8 | c  | -> | S2 | — | 2 |

This state transition diagram and the rules above will detect those patterns that match the regular expression above including the type of strings listed above and will return an output of a 1 when a pattern match is detected.

The apparatus 10 also includes a pattern distribution device (which could form part of the control 20), although more usually, the pattern distribution is executed by a software component. This device is arranged to receive the patterns that are to be detected by the apparatus 10. The pattern distribution device is arranged to distribute the patterns across a plurality of pattern collections, and to convert each pattern collection into a plurality of state transition rules. This two part process is executed under the action of two separate algorithms, a first splitting the patterns evenly across the plurality of pattern collections, and the second then converting each collection into a series of state transition rules. The pattern distribution device is arranged, when distributing the patterns across the plurality of pattern collections, to distribute the patterns according to commonality and conflict between patterns.

A summary of the pattern compiler operation is:
Step 1: The pattern distribution algorithm distributes the patterns over N pattern collections, where N corresponds with the number of B-FSM engines.
Step 2: The transition rule generator algorithm converts each pattern collection into an enhanced state transition diagram comprised of state transition rules involving wildcards and priorities (including resolution of intra/inter-pattern conflicts, case-sensitivity).
Step 3: The B-FSM compiler algorithm converts each of the N enhanced state transition diagrams into a storage-efficient B-FSM data structure for each of the N B-FSM engines (including state clustering, state encoding, BaRT compression).
All steps support incremental updates.

Figure 10:
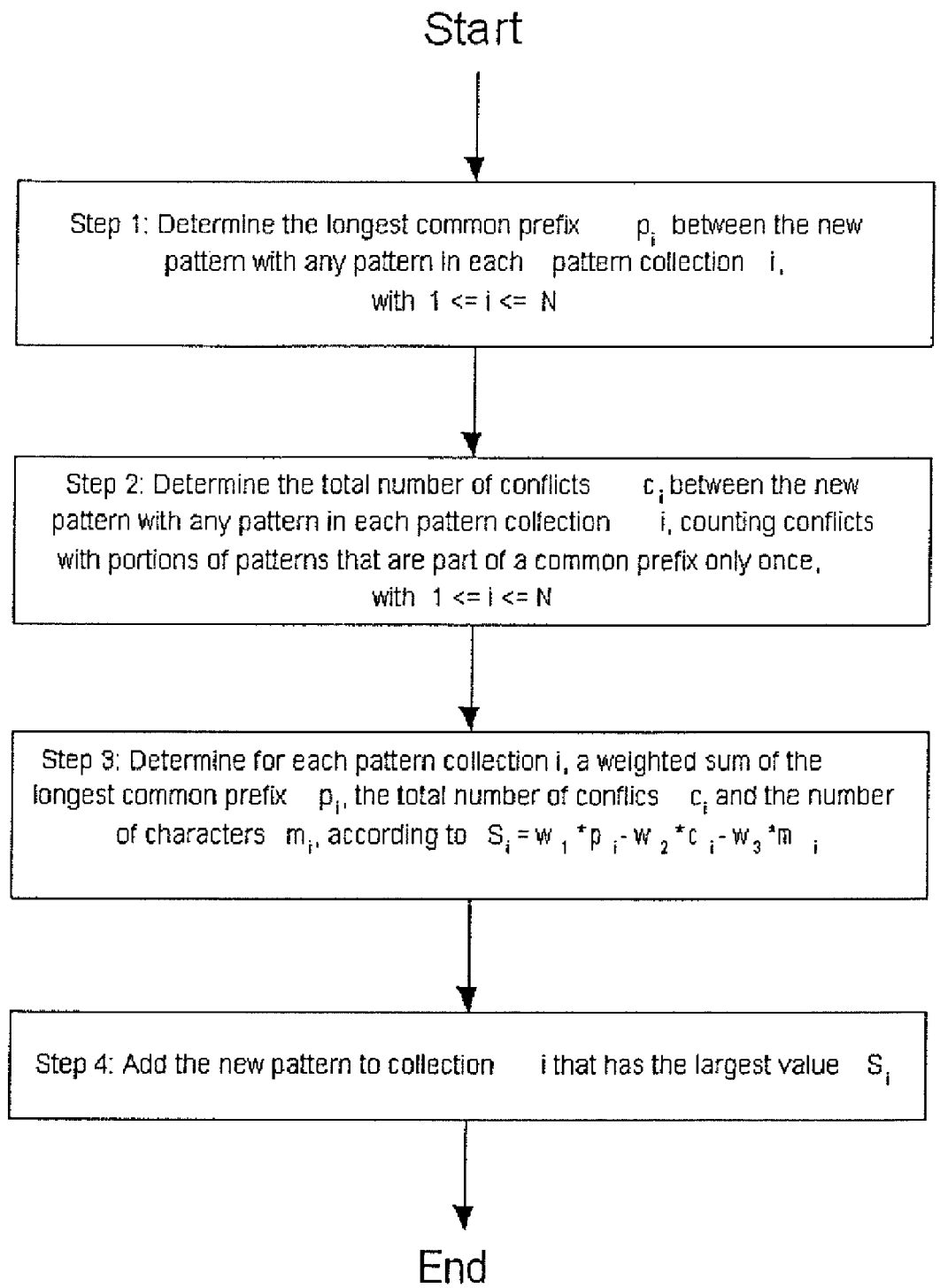
FIG. 10 is a flowchart of a pattern distribution algorithm.

FIG. 10 details an example of an algorithm to separate the list of patterns into separate pattern collections. The distribution of patterns is, in general terms, over N pattern collections.

The description of the pattern distribution algorithm contains the terms "common prefix" and "pattern conflict" which are defined as follows: Common prefix: two patterns are said to have a common prefix of length k if the first k characters of both patterns are identical. Example: the patterns "testing" and "testcase" have a common prefix "test" with a length of 4 characters. Pattern conflict: a conflict exists between two patterns if a substring of, one pattern not including its first character, is a prefix of the other pattern. Example: two conflicts exist between the patterns "testing" and "pattern": (1) the single-character string comprised of the third character of "pattern", namely "t", is a prefix of "testing", and (2) the string formed by the fourth and fifth character of "pattern", namely "te", is also a prefix of "testing".

The objective of the pattern distribution algorithm is to distribute the patterns over N pattern collections such that (1) the number of characters that are part of a common prefix in each collection is increased, in the ideal case even maximized, (2) the number of conflicts that exist between the patterns in each collection is reduced, in the ideal case even minimized, and (3) the patterns are distributed over the various collections such that the accumulated pattern length is similar for all collections (an even distribution of the pattern characters over the collections).

Because these three conditions are not related and might even be conflicting, weights can be assigned to each of them, in order to express their relative importance. In many pattern-matching applications, patterns will be added in a given order. For example, in an intrusion detected application, patterns are added in the order in which new viruses or worms have been identified and appropriate rules have been created for detecting those.

Based on this property, a first embodiment of the pattern distribution algorithm comprises the following steps, which are repeated for each pattern in the order in which it is added to one of the N pattern collections that shall be detected by the N rule engines:

Step 1: Determine the longest common prefix between the new pattern to be added, with any pattern in each of the N pattern collections, containing the patterns that already have been distributed. The longest common prefix for collection i will be represented by $p_i$ with $1 \leq i \leq N$.

Step 2: Determine the total number of conflicts between the new pattern to be added, with any pattern in each of the N pattern collections, thereby counting conflicts with portions of patterns that are part of a common prefix only once. The total number of conflicts with patterns in collection i will be represented by $c_i$ with $1 \leq i \leq N$. The total number of characters (i.e., the accumulated pattern length) in each collection will be represented by $m_i$ with $1 \leq i \leq N$.

Step 3: Determine for each pattern collection a weighted sum of the three parameters using three weights $w_1$, $w_2$ and $w_3$, in the following way:

$S_i = (w_1 * p_i) - (w_2 * c_i) - (w_3 * m_i)$

Step 4: Add the pattern to collection i that has the largest value $S_i$.

The above four steps are shown in the flow chart of FIG. 10. This is only one example of an algorithm to spread the patterns across the pattern collections. Other possibilities for changing this process include:

(1) The use of fewer or more parameters to determine which collection a pattern would be added to.
(2) Using functions instead of fixed values as weights. For example, weight $w_3$ in the above four steps, could be a function that depends on both the number of patterns/characters in a given collection in combination with a certain upper limit (e.g., based on the actual memory included in the rule engine that will be used to store this pattern collection). This would allow the realisation of an algorithm in which the fill rate is only taken into account if the number of patterns is approaching the upper limit (the actual size of the memory) by increasing the weight in that situation.
(3) Different orders of insertion, for example, by first sorting the patterns by length.
(4) Implementations of search structures that allow for the efficient determination of the longest common prefix and pattern conflicts, for example, tree structures and hash table structures for determining longest matching prefixes.

A second embodiment of the pattern distribution algorithm would comprise a "brute force" approach, in which for each new pattern and pattern collection the actual memory requirements are determined, by applying the transition rule generation algorithm and the B-FSM algorithm, and then selecting the collection for which the actual memory requirements are lower, or even minimal and are within the limit of the actual storage capacity of the memory that is part of the corresponding rule engine. While this approach will achieve reduced memory requirements for the given order of inserting patterns, it will take more time for selecting the pattern collection to which a new pattern is added, and consequently result in a slower update performance, compared to the first embodiment described before.

Once all patterns have been added to the pattern collections, then each pattern collection is converted into a series of state transition diagrams. Two approaches for generating the state transition rules are described below. The first approach is shown in the flowchart of FIG. 11.

Approach 1: Convert patterns into a list of states, and generate transition rules based on the pattern prefixes that are associated with each state.

Create list of states: steps 1-2
  Step 1: Convert each pattern comprised of N characters into a list of N states such that with each state a different prefix of the pattern is associated, having a size equal to 1, 2, . . . N respectively. Note: the last state will be associated with the original pattern (prefix size=pattern size (N)).
  Step 2: Remove duplicate states, i.e., states that are associated with exactly the same pattern prefixes.

Generate transition rules: steps 3-5
  Step 3: Create a default transition rule to state S0, involving a wildcard condition for both the current state and input, and having a priority 0.
  Step 4: Search the list of states for states that are associated with a prefix comprised of a single character. Create a transition rule to each of these states, involving a wildcard for the current state, the single character prefix as input value, and having a priority 1.
  Step 5: Search the list of states for pairs of states ($S_i$,$S_j$) that have the property that the prefix associated with state $S_i$, or the last part of that prefix, equals the prefix that is associated with state $S_j$ after removal of its last character. Create for each of these pairs a transition rule from state $S_i$ to state $S_j$ involving the last character of the prefix associated with state $S_j$ as input value, and having a priority 2.

The described approach will now be illustrated using an example involving the detection of all occurrences of three patterns "testing", "testcase" and "pattern" that can occur anywhere in the input stream.

Step 1: create list of states with associated prefixes. This results in the following states and prefixes for the three patterns:
state=S1 pattern="t"
state=S2 pattern="te"
state=S3 pattern="tes"
state=S4 pattern="test"
state=S5 pattern="testi"
state=S6 pattern="testin"
state=S7 pattern="testing"
state=S8 pattern="t"
state=S9 pattern="te"
state=S10 pattern="tes"
state=S11 pattern="test"
state=S12 pattern="testc"
state=S13 pattern="testca"
state=S14 pattern="testcas"
state=S15 pattern="testcase"
state=S16 pattern="p"
state=S17 pattern="pa"
state=S18 pattern="pat"
state=S19 pattern="patt"
state=S20 pattern="patte"
state=S21 pattern="patter"
state=S22 pattern="pattern"
Step 2: Remove duplicate states.
States S8, S9, S10 and S11 are removed because these are equal to states S1, S2, S3 and S4 respectively. The state list after step 2 now reads:
state=S1 pattern="t"
state=S2 pattern="te"
state=S3 pattern="tes"
state=S4 pattern="test"
state=S5 pattern="testi"
state=S6 pattern="testin"
state=S7 pattern="testing"
state=S12 pattern="testc"
state=S13 pattern="testca"
state=S14 pattern="testcas"
state=S15 pattern="testcase"
state=S16 pattern="p"
state=S17 pattern="pa"
state=S18 pattern="pat"
state=S19 pattern="patt"
state=S20 pattern="patte"
state=S21 pattern="patter"
state=S22 pattern="pattern"
Step 3: Create default rule.
Transition rule list after step 3:

| rule | current state | input | -> | new state | output | Priority |
|---|---|---|---|---|---|---|
| R1 | * | * | -> | S0 | — | 0 |

Step 4: Search for states that are associated with a single-character prefix and create a transition rule to each of these states, with a wildcard current state and priority 1. There exist two states with a single-character prefix: S1 and S16. After creating a transition rule for each of these states, the transition rule list equals:

| rule | current state | input | -> | new state | output | Priority |
|---|---|---|---|---|---|---|
| R1 | * | * | -> | S0 | — | 0 |
| R2 | * | t | -> | S1 | — | 1 |
| R3 | * | p | -> | S16 | — | 1 |

Step 5: Search for pairs of states $(S_i, S_j)$ that have the property that the prefix associated with state $S_i$, or the last part of that prefix, equals the prefix that is associated with state $S_j$ after removal of its last character. Create for each of these pairs a transition rule.

State S1 and state S2 form a pair of states with the property: the prefix associated with state S1 ("t") equals the prefix associated with state S2 after removal of its last character ("t"). As a result a transition rule will be created from state S1 to S2 involving the last character of the prefix associated with state S2 ("e") as input and having a priority 2:

| R | S1 | e | -> | S2 | — | 2 |
|---|---|---|---|---|---|---|

State S20 and state S3 also form a pair with the above property: the last part of the prefix associated with state S20 ("patte") equals the prefix associated with state S3 after removal of its last character ("te"). As a result a transition rule will be created from state S20 to S3 involving the last character of the prefix associated with state S3 ("s") as input and having a priority 2:

| R | S20 | s | -> | S3 | — | 2 |
|---|---|---|---|---|---|---|

After all pairs of states with the above property have been found and corresponding transition rules have been created, the transition rule list equals:

| rule | current state | input | -> | new state | output | Priority |
|---|---|---|---|---|---|---|
| R1 | * | * | -> | S0 | — | 0 |
| R2 | * | t | -> | S1 | — | 1 |
| R3 | * | p | -> | S16 | — | 1 |
| R4 | S1 | e | -> | S2 | — | 2 |
| R5 | S2 | s | -> | S3 | — | 2 |
| R6 | S3 | t | -> | S4 | — | 2 |
| R7 | S4 | i | -> | S5 | — | 2 |
| R8 | S5 | n | -> | S6 | — | 2 |
| R9 | S6 | g | -> | S7 | — | 2 |
| R10 | S4 | c | -> | S12 | — | 2 |
| R11 | S12 | a | -> | S13 | — | 2 |
| R12 | S13 | s | -> | S14 | — | 2 |
| R13 | S14 | e | -> | S15 | — | 2 |
| R14 | S16 | a | -> | S17 | — | 2 |
| R15 | S17 | t | -> | S18 | — | 2 |
| R16 | S18 | t | -> | S19 | — | 2 |
| R17 | S19 | e | -> | S20 | — | 2 |
| R18 | S20 | r | -> | S21 | — | 2 |
| R19 | S21 | n | -> | S22 | — | 2 |
| R20 | S4 | e | -> | S2 | — | 2 |
| R21 | S18 | e | -> | S2 | — | 2 |
| R22 | S20 | s | -> | S3 | — | 2 |

After the state transition rules have been generated as described above, output components are assigned to the state transition rules that correspond to the last characters of the patterns that have been converted. In the above example, state transition rules 9, 13 and 19 will be assigned output components corresponding to the respective patterns "testing", "testcase", and "pattern".

The second approach is to convert patterns into transition rules and resolve collisions by direct processing of transition rules.

Step 1: A default transition rule is created to state S0, involving a wildcard condition for both the current state and input, and having a priority 0. Steps 2-3 are applied to each pattern:

Step 2: Parse each next pattern that will be converted using the transition rules that have already been created (in other words: use the next pattern as "input stream", and process it using the existing transition rules) until a transition to state S0 is made (default transition rule). In this way, the longest common prefix with any other pattern is determined that has already been converted: transition rules exist already for the characters comprising this common prefix.

Step 3: Next: create a transition rule for each character in the pattern that is not part of the common prefix as determined in step 2, with a new unique next state.

The transition rule corresponding to the first character of the pattern (if there was no common prefix), will contain a wildcard for the current state and have a priority 1. The transition rules for the other characters will have a current state that is equal to next state of the transition rule corresponding to the previous character in the pattern and have a priority 2.

Step 4: Pattern collisions are resolved in the following way. For each "priority 1" transition rule (wildcard current state), it is checked if "priority 2" transition rules exist (non-wild card current state) that involve the same input value. It is now assumed that a given "priority 1" transition rule involves a transition to a next state n1 and that a "priority 2" transition rule is found with the same input character involving a transition to a next state n2. Now for all transition rules that exist with a current state equal to n1, a new copy of these rules will be created involving a current state n2. If there already exists a transition rule that involves the same current state (n2) and input value as one of the new copied transition rules, then the same operation is iterated on the next states of these two "colliding" rules, while the copied rule will be removed. This operation is repeated until no collisions are found anymore.

The described approach will now be illustrated using an example involving the detection of all occurrences of three patterns "testing", "testcase" and "pattern" that can occur anywhere in the input stream.

Step 1: create default rule.
Transition rule list after step 1:

| rule | current state | input | -> | new state | output | priority |
|---|---|---|---|---|---|---|
| R1 | * | * | -> | S0 | — | 0 |

Convert pattern "testing":
Step 2: Parse "testing" using existing rules.
Only one default rule exists to state S0, therefore no common prefix.
Step 3: Create transition rule for each character that is not part of common prefix: rules 1-8. Transition rule list after converting "testing":

| rule | current state | input | -> | new state | output | priority |
|---|---|---|---|---|---|---|
| R1 | * | * | -> | S0 | — | 0 |
| R2 | * | t | -> | S1 | — | 1 |
| R3 | S1 | e | -> | S2 | — | 2 |
| R4 | S2 | s | -> | S3 | — | 2 |
| R5 | S3 | t | -> | S4 | — | 2 |
| R6 | S4 | i | -> | S5 | — | 2 |
| R7 | S5 | n | -> | S6 | — | 2 |
| R8 | S6 | g | -> | S7 | — | 2 |

Convert pattern "testcase":
Step 2: Parse "testcase" using existing rules.
The first four characters of "testcase" are parsed by the transition rules 2, 3, 4 and 5 (in this order), while the fifth character would cause a transition to state S0. Consequently a common prefix "test" exists.
Step 3: Create transition rule for each character that is not part of common prefix: rules 9-12. Transition rule list after converting the remaining portion of the pattern, namely "case":

| rule | current state | input | -> | new state | output | priority |
|---|---|---|---|---|---|---|
| R1 | * | * | -> | S0 | — | 0 |
| R2 | * | t | -> | S1 | — | 1 |
| R3 | S1 | e | -> | S2 | — | 2 |
| R4 | S2 | s | -> | S3 | — | 2 |
| R5 | S3 | t | -> | S4 | — | 2 |
| R6 | S4 | i | -> | S5 | — | 2 |
| R7 | S5 | n | -> | S6 | — | 2 |
| R8 | S6 | g | -> | S7 | — | 2 |
| R9 | S4 | c | -> | S8 | — | 2 |
| R10 | S8 | a | -> | S9 | — | 2 |
| R11 | S9 | s | -> | S10 | — | 2 |
| R12 | S10 | e | -> | S11 | — | 2 |

Convert pattern "pattern":
Step 2: Parse "pattern" using existing rules.
The first character of "pattern" causes a transition to state S0. Consequently no common prefix exists.
Step 3: Create transition rule for each character that is not part of the common prefix: rule 13-19. Transition rule list after converting the remaining portion of the pattern, namely "case":

| rule | current state | input | -> | new state | output | priority |
|---|---|---|---|---|---|---|
| R1 | * | * | -> | S0 | — | 0 |
| R2 | * | t | -> | S1 | — | 1 |
| R3 | S1 | e | -> | S2 | — | 2 |
| R4 | S2 | s | -> | S3 | — | 2 |
| R5 | S3 | t | -> | S4 | — | 2 |
| R6 | S4 | i | -> | S5 | — | 2 |
| R7 | S5 | n | -> | S6 | — | 2 |
| R8 | S6 | g | -> | S7 | — | 2 |
| R9 | S4 | c | -> | S8 | — | 2 |
| R10 | S8 | a | -> | S9 | — | 2 |
| R11 | S9 | s | -> | S10 | — | 2 |
| R12 | S10 | e | -> | S11 | — | 2 |
| R13 | * | p | -> | S12 | — | 2 |
| R14 | S12 | a | -> | S13 | — | 2 |
| R15 | S13 | t | -> | S14 | — | 2 |
| R16 | S14 | t | -> | S15 | — | 2 |
| R17 | S15 | e | -> | S16 | — | 2 |
| R18 | S16 | r | -> | S17 | — | 2 |
| R19 | S17 | n | -> | S18 | — | 2 |

Step 4: Resolve pattern collisions.

Transition rule 2 (priority 1) and transition rule 5 (priority 2) collide. Rule 2 involves a transition to state S1. Rule 5 involves a transition to state S4. There exists one transition from state S1, namely rule 3. Now a copy of rule 3 is created, with the current state replaced by S4.

| R20 | S4 | e | -> | S2 | — | 2 |

Transition rule 2 (priority 1) and transition rule 15 (priority 2) collide. Rule 2 involves a transition to state S1. Rule 15 involves a transition to state S14. There exists one transition from state S1, namely rule 3. Now a copy of rule 3 is created, with the current state replaced by S14.

| R21 | S14 | e | -> | S2 | — | 2 |

Transition rule 2 (priority 1) and transition rule 16 (priority 2) collide. Rule 2 involves a transition to state S1. Rule 15 involves a transition to state S15. There exists one transition from state S1, namely rule 3. Now a copy of rule 3 is created, with the current state replaced by S15.

| R | S15 | e | -> | S2 | — | 2 |

However, there is already a transition rule in existence with the same current state and input, namely rule 17. The copied rule involves a transition to state S2. Rule 17 involves a transition to state S16. There exists one transition from state S2, namely rule 4. Now a copy of rule 4 is created with the current state replaced by S17.

| R22 | S17 | e | -> | S3 | — | 2 |

No other collisions have been found. Transition rule list after resolving all collisions:

| rule | current state | Input | -> | new state | output | priority |
|---|---|---|---|---|---|---|
| R1  | *   | *  | -> | S0  | — | 0 |
| R2  | *   | t  | -> | S1  | — | 1 |
| R3  | S1  | e  | -> | S2  | — | 2 |
| R4  | S2  | s  | -> | S3  | — | 2 |
| R5  | S3  | t  | -> | S4  | — | 2 |
| R6  | S4  | i  | -> | S5  | — | 2 |
| R7  | S5  | n  | -> | S6  | — | 2 |
| R8  | S6  | g  | -> | S7  | — | 2 |
| R9  | S4  | c  | -> | S8  | — | 2 |
| R10 | S8  | a  | -> | S9  | — | 2 |
| R11 | S9  | s  | -> | S10 | — | 2 |
| R12 | S10 | e  | -> | S11 | — | 2 |
| R13 | *   | p  | -> | S12 | — | 2 |
| R14 | S12 | a  | -> | S13 | — | 2 |
| R15 | S13 | t  | -> | S14 | — | 2 |
| R16 | S14 | t  | -> | S15 | — | 2 |
| R17 | S15 | e  | -> | S16 | — | 2 |
| R18 | S16 | r  | -> | S17 | — | 2 |
| R19 | S17 | n  | -> | S18 | — | 2 |
| R20 | S4  | e  | -> | S2  | — | 2 |
| R21 | S14 | e  | -> | S2  | — | 2 |
| R22 | S17 | e  | -> | S3  | — | 2 |

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embodied in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by

What is claimed, is:

1. An apparatus including a processor for detecting a pattern in a data stream comprising:
a pattern matching device for receiving the data stream, the pattern matching device comprising:
at least one rule engine, said at least one rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component, the first, second and third rules having differing priorities; and
at least one state transition rule including an output component indicating a pattern match, the apparatus arranged to pass the data stream to said at least one rule engine, and further arranged to output a signal indicating a pattern match when a state transition rule indicates a pattern match; and
a pattern distribution device configured to receive patterns, to distribute the patterns across a plurality of pattern collections, and to convert each pattern collection into the plurality of state transition rules;
wherein the pattern distribution device is configured, when distributing the patterns across the plurality of pattern collections, to distribute the patterns according to a commonality between patterns and a conflict between patterns; and
wherein the conflict between patterns defines a substring of one pattern excluding a first character, as being a prefix of another pattern such that conflicting patterns defined as the conflict between patterns are distributed in a different plurality of pattern collections.

2. An apparatus according to claim 1, wherein the pattern distribution device is arranged to distribute the patterns substantially evenly across the plurality of pattern collections.

3. An apparatus according claim 1, further comprising a results processor for receiving output from said at least one rule engine, the results processor arranged to determine if a pattern match has occurred.

4. An apparatus according claim 1, wherein at least one of the state transition rules includes a character class component.

5. An apparatus according claim 1, wherein the pattern matching device comprises a plurality of rule engines.

6. An apparatus according to claim 5, wherein the rule engines are arranged in at least one pair of rule engines, with said at least one pair of rule engines processing alternate portions of the data stream.

7. An apparatus according to claim 6, further comprising a results processor for receiving output from said at least one rule engine, the results processor arranged to determine if a pattern match has occurred, wherein the results processor is arranged to combine the outputs of said at least one pair of rule engines.

8. A method for detecting a pattern in a data stream Comprising:
receiving the data stream;
running at least one rule engine, said at least one rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component;
wherein the first, second and third rules have differing priorities, and at least one state transition rule includes an output component indicating a pattern match;
distributing patterns across a plurality of pattern collections;
converting each pattern collection into the plurality of state transition rules;
wherein, when distributing the patterns across the plurality of pattern collections, the patterns are distributed according to a commonality between patterns and a conflict between patterns; and
wherein the conflict between patterns defines a substring of one pattern excluding a first character, as being a prefix of another pattern such that conflicting patterns defined as the conflict between patterns are distributed in a different plurality of pattern collections;
passing the data stream to said at least one rule engine; and
outputting a signal indicating a pattern match when a state transition rule indicates a pattern match.

9. A method according to claim 8, wherein distributing the patterns across the plurality of pattern collections distributes the patterns substantially evenly across the plurality of pattern collections.

10. A method according to claim 8, wherein distributing the patterns across the plurality of pattern collections is executed by an algorithm.

11. A method according to claim 8, further comprising processing the output from said at least one rule engine to determine if a pattern match has occurred.

12. A method according to claim 8, wherein at least one of the state transition rules includes a character class component.

13. A method according to claim 8, comprising running a plurality of rule engines.

14. A method according to claim 13, wherein the rule engines are arranged in at least one pair of rule engines, with said at least one pair of rule engines processing alternate portions of the data stream.

15. A method according to claim 14, further comprising processing the output from said at least one rule engine to determine if a pattern match has occurred, wherein the processing of the outputs of the rule engines comprises combining the outputs of said at least one pair of rule engines.

16. A computer program product embodied on a non-transitory computer readable medium for controlling apparatus for detecting a pattern in a data stream, the computer program product comprising instructions for:
receiving the data stream;
running at least one rule engine, said at least one rule engine operating under a plurality of state transition rules encoding a plurality of patterns, a first state transition rule including a wildcard state component and a wildcard input component, a second state transition rule including a wildcard state component and a specified input component, and a third state transition rule including a specified state component and a specified input component;
wherein the first, second and third rules have differing priorities, and the at least one state transition rule includes an output component indicating a pattern match;

distributing patterns across a plurality of pattern collections;

converting each pattern collection into the plurality of state transition rules;

wherein, when distributing the patterns across the plurality of pattern collections, the patterns are distributed according to a commonality between patterns and a conflict between patterns; and wherein the conflict between patterns defines a substring of one pattern excluding a first character, as being a prefix of another pattern such that conflicting patterns defined as the conflict between patterns are distributed in a different plurality of pattern collections;

passing the data stream to said at least one rule engine; and outputting a signal indicating a pattern match when a state transition rule indicates a pattern match.

17. A computer program product according to claim 16, wherein distributing the patterns across the plurality of pattern collections distributes the patterns substantially evenly across the plurality of pattern collections.

18. A computer program product according to claim 16, wherein distributing the patterns across the plurality of pattern collections is executed by an algorithm.

19. A computer program product according to claim 16, further comprising instructions for processing the output from said at least one rule engine to determine if a pattern match has occurred.

20. A computer program product according to claim 16, wherein at least one of the state transition rules includes a character class component.

21. A computer program product according to claim 16, comprising instructions for running a plurality of rule engines.

22. A computer program product according to claim 21, wherein the rule engines are arranged in at least one pair of rule engines, with said at least one pair of rule engines processing alternate portions of the data stream.

23. A computer program product according to claim 22, further comprising instructions for processing the output from said at least one rule engine to determine if a pattern match has occurred, wherein the processing of the outputs of the rule engines comprises combining the outputs of said at least one pair of rule engines.

* * * * *